FLAT PACKAGE ELECTRICAL DEVICE

Filed May 9, 1958 2 Sheets-Sheet 1

FLAT PACKAGE ELECTRICAL DEVICE

Filed May 9, 1958 2 Sheets-Sheet 2

WITNESSES

Theodore F. Wrobel

Donald M. Winegar

INVENTORS
Alfred Meyerhoff and
Peter M. Guzanick
BY
C. L. Menzemer
ATTORNEY

United States Patent Office 3,513,361
Patented May 19, 1970

3,513,361
FLAT PACKAGE ELECTRICAL DEVICE

Alfred Meyerhoff, Greensburg, and Peter M. Guzanick, Monroeville, Pa., assignors to Westinghouse Electric Corporation, Pittsburgh, Pa., a corporation of Pennsylvania Filed May 9, 1968, Ser. No. 727,875
Int. Cl. H01l 1/06
U.S. Cl. 317—234 5 Claims

ABSTRACT OF THE DISCLOSURE

A gate lead electrically connected to the base region of a semiconductor element of a flat package electrical device extends downwardly through the top surface of the device and through an aperture in an electrical contact in physical contact with another region of semiconductivity of the element.

BACKGROUND OF THE INVENTION

Field of the invention

This invention relates to semiconductor devices.

Description of the prior art

With reference to FIG. 1 there is shown a prior art flat package electrical device 10. The device 10 comprises a semiconductor element 12 hermetically sealed within an enclosure comprised of two housing assemblies 14 and 16. The housing assembly 14 is comprised of an electrical contact 18 formed by a metal membrane 20 to one end of an electrical insulator 22. An electrically conductive annular metal member 24 is joined to the other end of the member 22.

The housing 16 is comprised of an electrical contact 26 joined by a metal membrane 28 to one end of an electrical insulator 30. An electrically conductive annular metal member 32 is joined to the other end of the member 30.

The enclosure for the semiconductor element 12 is formed by joining the metal member 24 of the housing 14 to the metal member 32 of the housing 16.

The electrical contact 18 is electrically connected to a first region of the element 12. The electrical contact 26 is electrically connected to a second region of the element 12. An electrical lead 34 electrically connects a third region of the element 12 to the members 24 and 32 which are joined together.

The insulator 22 electrically insulates the contact 18 and the members 24 and 32 from each other. During the assembly process and during the operation of the device 10, it has been found that the insulator 22 fractures in one or more places, the fracture being oriented in generally a vertical position and extending between the members 20 and 24. The insulator 22 is also subject to shear failures completely separating the insulator 22 from the member 24.

SUMMARY OF THE INVENTION

In accordance with the teachings of this invention there is provided an electrical device comprising a pair of spaced opposed electrical contacts, one of the contacts having walls defining an aperture therein; a hollow electrical insulator member hermetically joined to the pair of spaced electrical contacts to form an enclosure therewith enclosing the space between the pair of spaced electrical contacts, the pair of spaced electrical contacts forming opposed major surfaces of the enclosure; a semiconductor element disposed within the enclosure, the element having at least three regions of alternate type semiconductivity, a first region of the element being in a physical, electrical and thermal conductive relationship with one of the electrical contacts, and a second region of the element being in a physical, electrical and thermal conductive relationship with the second of the electrical contacts; and an electrical lead hermetically sealed within the aperture of, and electrically insulated from, the one of the spaced electrical contacts and electrically connected to a third region of semiconductivity of the semiconductor element.

An object of this invention is to provide a gate lead to the base region of a semiconductor element of a flat package electrical device wherein the gate lead is disposed within, and electrically insulated from, an electrical contact in a physical, electrical and thermal conductive relationship with a second region of semiconductivity of the element.

Other objects of this invention will, in part, be obvious, and will, in part, appear hereinafter.

DESCRIPTION OF THE DRAINGS

In order to more fully understand the nature and objects of this invention, reference should be had to the following drawings wherein.

DESCRIPTION OF THE INVENTION

Figure 1:
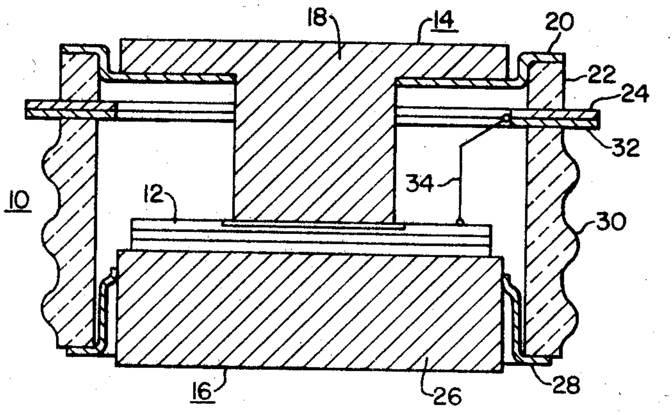
FIG. 1. PRIOR ART
FIG. 1 is an elevation view, in cross-section, of a prior art flat package electrical device.
Figure 2:
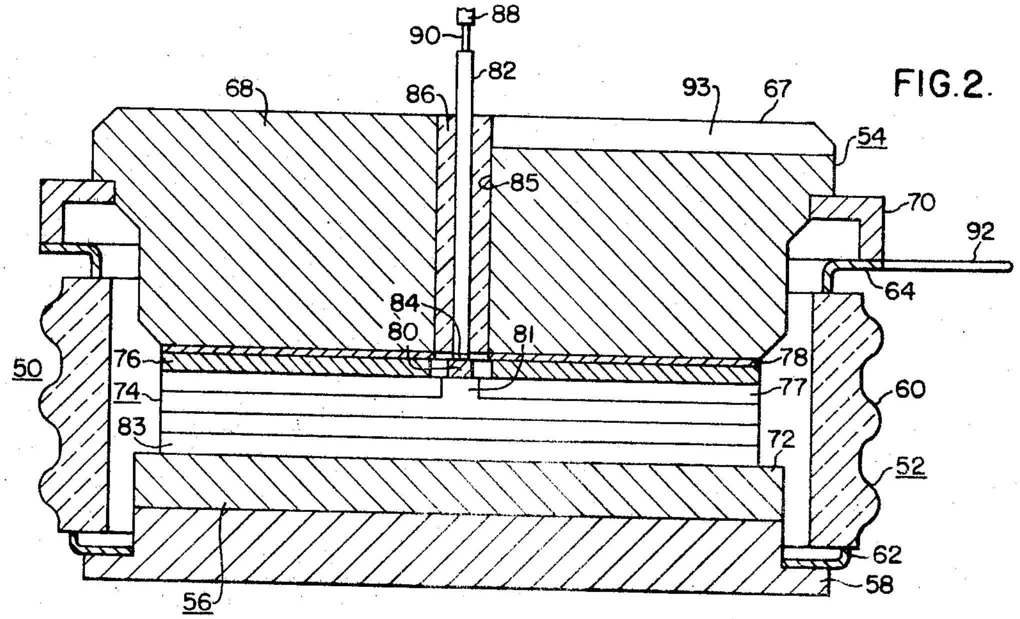
FIG. 2 is an elevation view, partly in cross-section, of a flat package electrical device made in accordance with the teachings of this invention.

With reference to FIG. 2 there is shown a flat package electrical device 50 made in accordance with the teachings of this invention. The device 50 comprises three major portions, a lower housing assembly 52, an upper housing assembly 54, and a fusion assembly 56.

The lower housing assembly 52 comprises an electrically and thermally conductive support member 58 and an upwardly extending electrically insulated hollow member 60 joined at its bottom surface to the support member 58 by a first metal member 62. A second metal member 64 is joined to the top surface of the hollow member 60. All joints are hermetic seals.

The upper housing assembly 54 comprises an electrical contact 68 to which is affixed an annular metal weld ring 70. Welding of the weld ring 70 to the second annular member 64 of the lower housing assembly 52 forms a part of the hermetic encapsulation of the fusion assembly 56.

The fusion assembly 56 is disposed within the upwardly extending hollow member 60 between, and in an electrical and thermal conductive relationship with the support member 58 and the electrical contact 68. The fusion assembly 56 comprises a first electrical contact 72 and a semiconductor element 74 having at least three, and preferably four, regions of semiconductivity. The first electrical contact 72 is electrically connected to the third region 83 of the element 74. A second electrical contact 76 is affixed to a first region 77 of the element 74. The second electrical contact 76 is electrically connected to the electrical contact 68 by an electrically and thermally conductive layer 78 affixed to the contact 68.

A third electrical contact 80 is in contact with a base region 81 of the element 74. An electrical lead 82, having a button-shaped contact 84, is electrically connected to the third electrical contact 80 and extends upwardly through an aperture 85 in the contact 68. The electrical lead 82 is electrically insulated from the contact 68 and is suitably sealed within the aperture of the contact 68 by a layer 86 of electrically insulating material to comprise a second portion of the hermetic sealing means for the semiconductor element 74.

Electrical connections to facilitate the incorporation of the device 50 in electrical apparatus are provided by electrically connecting a first electrical terminal 88 to an electrical conductor 90 of the lead 82 and a second electrical connector 92 to the second angular member 64. The electrical lead 82 may also be brought to the side of the device 50 by disposing the lead 82 in a slot 93 in the top surface 67 of the contact 68 to facilitate mounting of the device 50 in electrical apparatus.

Figure 3:
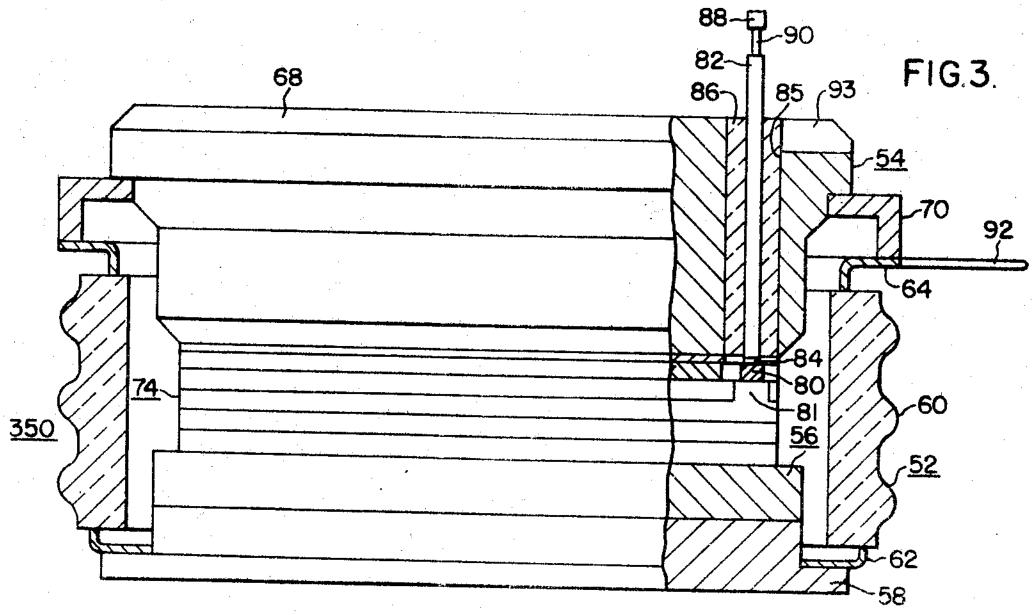
FIGS. 3, 4 and 5 are elevation views, partly in cross-section, of alternate embodiments of the device of FIG. 2.

Referring now to FIG. 3, there is shown a flat package electrical device 350 which is a modification of the device 50. All of the components of the device 350 are exactly the same as those comprising the device 50 except for the location of the base region 81 in the semiconductor element 74 and the location of the electrical lead 82 in the contact 68. In the device 350 the lead 82 is gated to the base region 81 at a location on a portion of the outer peripheral top surface of the element 74 and the lead 82 is disposed in the aperture 85 which is located in the outer peripheral portion of the contact 68. The lead 82 is hermetically sealed within, and electrically insulated from, the contact 68.

Figure 4:
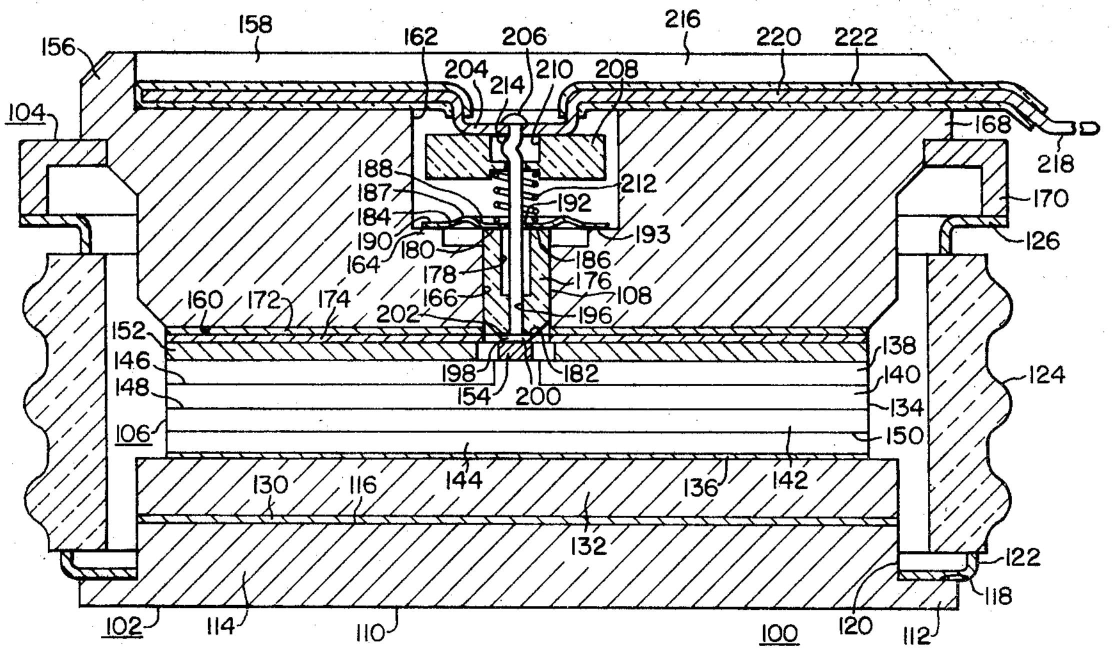

With reference to FIG. 4 there is shown an electrical device 100 which is an alternate embodiment of the flat package electrical device 50 and which is made in accordance with the teachings of this invention.

The device 100 comprises a lower housing assembly 102, an upper housing assembly 104, a fusion assembly 106, and a contact assembly 108.

The lower housing assembly 102 comprises an electrically and thermally conductive support member 110 having a peripheral flange 112 and an upwardly extending pedestal portion 114. The upwardly extending pedestal portion 114 has an uppermost mounting surface 116 and a peripheral side surface 120. The peripheral flange 112 has a top surface 118.

The support member 110 is made of a metal selected from the group consisting of copper, silver, aluminum, base alloys thereof and ferrous base alloys. Copper and brass, a base alloy of copper, has been found particularly satisfactory for this purpose.

A first annular angle-shaped metal member 122 is disposed on the top surface 118 of the flange 112 of the support member 110. The member 122 is affixed to the support member 110 by a suitable brazing material which joins a portion of the outer surface of one leg of the member 122 to the top surface 118 and the end surface of the second leg to the peripheral side surface 120 of the upwardly extending pedestal portion 114. A suitable brazing material comprises 60 percent, by weight, silver, 30 percent, by weight, copper, and 10 percent, by weight, tin.

The member 122 has the preferred shape in order that the thermal stresses of the device 100 may be compensated, in part, by the member 122. The vertical leg of the member 122 compensates, in part, for any horizontal movement. The horizontal leg of the member 122 compensates, in part, for any vertical movement. The member 122 is affixed to an upwardly extending cylindrical member 124 comprising an electrically insulating material such, for example, a ceramic material comprising aluminum oxide. Therefore, a preferred material comprising the member 122 is an alloy of 29 percent, by weight, nickel, 17 percent, by weight, cobalt, 0.45 percent, by weight, molybdenum, 0.01 percent by weight, silver, 0.02 percent, by weight, carbon, and the remainder iron. This material has a coefficient of thermal expansion similar to that of the material comprising the member 124 and can be joined to the member 124 by a braze material which also forms a hermetic seal.

A second annular angle-shaped member 126 is affixed to the upper end surface of the member 124. The member 126 comprises the same material as the member 122 and has the preferred angular shape for the same design reasons as those set forth for the member 122.

The outer surface of the member 124 incorporates several integral concentric protruding rings which increase the outside surface distance between the member 126 and the support member 110. The increased distance decreases the possibility of creepage, or electrical current leakage, between the two spaced members 110 and 126.

Disposed on the uppermost mounting surface 116 is a thermally and electrically conductive layer 130. The layer 130 compensates for any uneven surfaces which may be present either on the surface 116 or on the bottom of the fusion assembly 106 or both. A suitable material comprising the layer 130 is a metal selected from the group consisting of gold, tin, aluminum and silver. The fusion assembly 106 is disposed on the layer 130.

The fusion assembly 106 comprises a first electrical contact 132 and a semiconductor element 134. The contact 132 comprises a metal such, for example, as molybdenum, tungsten, tantalum, and combinations and base alloys thereof. The contact 132 is a firm supporting structure for the semiconductor element 134. The contact 132 is electrically and thermally conductive and has a very similar thermal expansion characteristic as the semiconductor element 134.

Although not required, the semiconductor element 134 is preferably joined to the first electrical contact 132 by a suitable prior joining operation. The joining of the semiconductor element 134 to the contact 132 may utilize a layer 136 of any suitable "hard" or "soft" solder known to those skilled in the art.

The solder layer 136 comprises a suitable solder, such, for example, as a silver, or a gold base solder, having a melting point above about 372° C. and known to those skilled in the art as a "hard" solder. A solder having a melting point below about 372° C., and known to those skilled in the art as a "soft" solder, may also be used. Such "soft"solders are usually, but need not be, lead base solders.

It will be understood, of course, that the particular type of solder will depend on the anticipated operating temperature range of the device 100.

The semiconductor element 134 has at least three regions of alternate type semiconductivity and two p-n junctions. Preferably the element 134 has four regions 138, 140, 142 and 144 of alternate type semiconductivity and three p-n junctions 146, 148 and 150, each of which is formed by the contiguous surfaces of two regions of alternate type semiconductivity. A second electrical contact 152 is affixed to the region 138 of the element 134, a third electrical contact 154 is affixed to the region 140 of the element 134, and the first electrical contact 132 is affixed to the region 144 of the element 134.

The upper housing assembly 104 comprises an apertured electrical contact 156. The contact 156 has an upper surface 158, a lower surface 160, an axially disposed cavity 162 having a peripheral shoulder 164 disposed in the lower portion thereof, and an axial bore 166. The cavity 162 and the bore 166 form the aperture which is a continuous passageway through the contact 156 from the upper surface 158 to the lower surface 160. The contact 156 has an outer peripheral flange 168 to which an annular weld ring 170 is affixed. Disposed on the lower surface 160 of the contact 156 is one or more electrically conductive metals to enhance the electrical and thermal conductive relationship between the contact 156 and the second electrical contact 156 of the element 134. Preferably, a layer 172 of molybdenum is disposed on the surface 160 and a layer 174 of silver is disposed on the layer 172 of molybdenum.

The upper housing assembly 104 is hermetically sealed to the lower housing assembly 102 by welding the member 126 of the lower housing assembly 102 to the annular weld ring 170 of the upper housing assembly 104.

The electrical contact assembly 108 is disposed within the cavity 162 of the apertured electrical contact 156 and protrudes downwardly through the axial bore 166. The assembly 108 comprises a locator member 176 which comprises an electrical insulating material, such, for example as a ceramic comprising aluminum oxide. The locator member 176 has an axially aligned cavity 178 extending from an upper end surface 180 of the locator member 176 to a point intermediate a bottom end surface 182. The end surface 182 is beveled to facilitate the assembly of the contact assembly 108 into the flat package electrical device 100.

A diaphragm 184 is affixed to the upper end surface 180 of the locator member 176 by a layer 186 of a suitable braze material. The material comprising the diaphragm 184 is any suitable material which will not be too reactive with the layer 186 of braze material and still have some resiliency and is capable of being brazed to ceramic materials thereby forming a hermetic seal. The diaphragm 184 has a preferred shape embodying an inverted closed circular trough 187 having integral outwardly extending flange portions 188 and 190 at the top of the walls defining the trough 187. The outer peripheral of the flange 188 defines a centrally disposed aperture 102. This preferred design enables the contact assembly 108 to compensate, in part, for the thermal stresses occurring during the operative life of the device 100. It has been found that a diaphragm 184 made of high purity nickel can be brazed by its flange 188 to the upper end surface 180 of the locator member 176 by a brazing alloy comprising, by weight, 95% silver and 5% copper which results in a hermetic seal being formed. The aperture 192 of the diaphragm 184 is axially aligned with the cavity 178 of the locator member 176. The contact assembly 108 is hermetically sealed to the apertured electrical contact 156 by a layer 193 of a suitable brazing alloy which joins the flange portion 190 of the diaphragm 184 to the upper surface of shoulder 164 of the cavity 162. A suitable brazing alloy is one comprising 95 percent, by weight, silver, and 5 percent, by weight, copper.

An electrical lead 194 extends through the aperture 192 of the diaphragm 184, through the cavity 162 of the locator member 176 and through an axial bore 196 of the locator 176 and terminates in a modified button shaped contact 198 having a peripheral flange surface area 200. The surface area 200 is hermetically sealed to the lower end surface 160 of the locator member 176. A suitable means for forming the hermetic seal is to employ a layer 202 of a suitable brazing alloy such, for example, as one comprising 95 percent silver and 5 percent copper by weight.

The electrical lead 194 comprises any suitable electrically conductive metal such, for example, as copper, aluminum, silver and base alloys thereof. Additionally, the solder layers 186 and 202 may each comprise any suitable brazing alloy which will form a hermetic seal between the components. However, because of the temperatures embodied in the processes in making the flat package electrical device 100 embodying the contact assembly 108, it is preferred that the lead 194 comprise copper and the solder layers 186 and 202 comprise the alloys hereinbefore disclosed.

The locator member 176 of the contact assembly 108 is slidable within the bore 166 to permit enough vertical movement of the assembly 108 to assure a pressure electrical contact between the button shaped contact 198 of the lead 194 and the third electrical contact 154 of the element 134.

The electrical lead 194 is extended upwardly and is electrically connected to an electrical contact spring 204. Preferably the lead 194 is electrically connected to the spring 204 by first passing the lead 194 through an aperture in the spring 204, forming a button head 206 on the lead 194, and soldering the button head 206 to the spring 204.

To properly align the exposed portion of the lead 194, a second locator member 208, comprising, preferably an electrically insulating material, such, for example, as polytetrafluoroethylene, is disposed within the cavity 162 of the contact 156. The lead 194 passes through an axially disposed bore 210 and is thereby properly axially aligned within the cavity 162.

A resilient force means 212, comprising, such for example, as a spring, is disposed on the inner flange 188 of the diaphragm 184 and extends upwardly contacting the bottom surface of the second locator member 208. Preferably, the bottom surface of locator member 208 has a centrally disposed recess which orients the upper portion of the resilient force means 212. The lower portion of the resilient force means 212 is oriented by the trough 187 of the diaphragm 184. The resilient force means 212 provides a means for retaining the components of the electrical connection to the third electrical contact 154 of the element 134 under pressure and compensates for thermal stresses which occur during operation of the device 100.

To prevent the accidental separation of the electrical lead 194 from the spring 204 or the separation of the contact 198 from the contact 154, a stress relief member 214 is provided within the lead 194 to provide for expansion and contraction of the lead 194. To make the spring contact 204 more resistant to the force loading of the spring 212, the spring contact 204 is deformed similar to an inverted hat-shaped section in the vicinity of the button head 206 providing a downwardly depending surface area of the contact 204 for the locator 208 to act upon.

To prevent lateral movement of the contact 204 about the upper surface 158 of the contact 156, the contact spring 204 is disposed in a slot 216 within the surface 158. Means for making an electrical connection to the contact 204 is provided by extending the contact 204 beyond the side surface of the device 100 on at least one side and terminating in a connecting tab 218. Since the spring contact 204 and the apertured metal contact 156 are each connected to a different region of the element 134, it is necessary that each be electrically insulated from each other. The spring contact 204 comprises an electrical conductive member 220 encapsulated within a suitable electrically insulating material 222. The member 220 may oomprise any suitable electrically conductive member, such, for example as silver, gold, copper or aluminum. The material 222 encapsulating the member 220 must electrically isolate the contacts 204 and 156 from each other while being resistant to attack by any processing or operating ambient of the device 100. Additionally, the contact 204 may be bonded within the slot 216 to the contact 156 by a suitable adhesive. A suitable material comprising the material 222 and which provides all the desirable properties is a polyepoxide derived from Bisphenol-A and epichlorohydrin cured with a condensation product of a dimeric fatty acid and a polyamine.

To further isolate the electrical contact 204 from the contact 156 it is desirable that all exposed portions of the electrical lead 194 within the cavity 162 be enclosed in a suitable electrically insulating material, such, for example, as polytetrafluoroethylene.

The apertured contact 156 has a sufficiently large mass to prevent accidental destruction of the element 134 because of the thermal energy created when the device 100 is operative. When the device 100 is turned on, an initial thermal shock wave is generated, which, if not properly dissipated, may cause the junction temperature of the element 134 to exceed its maximum rating and might cause a premature failure of the element 134.

To minimize this premature failure of the element 134 and to absorb the heat of the initial thermal shock wave, the contact 156 comprises a thermally conductive, as well as an electrically conductive material. Preferably the contact 80 comprises copper with a mass sufficiently large as to absorb the initial thermal surge prior to steady state heat conduction.

One notes therefore, that the electrical device 100 has an electrical lead 194 electrically connected to the semiconductor element 134 by a pressure electrical contact only. This electrical lead 194 comprising the pressure electrical contact is disposed within an electrical contact 156 eletrically connected to the same element 134 by a pressure means only and exits through the top surface 158 of this electrical contact 156. The electrical connection to the region 144 of the same semiconductor element 134 is by pressure means also.

To assure a pressure electrical contact between the components, one may design the device 100 to have a gap of from 0.005 inch to 0.025 inch between the member 126 and the weld ring 170 prior to their joining together. The components of the device 100 therefore are in pressure contact with each other before an external force is applied to the upper and lower housing assemblies 104 and 102 respectively when the device 100 is disposed in a clamping mechanism for power operation of the device 100.

The small gap provides a means for applying a force of from 35 to 150 pounds on the components of the device 100 without the requirement of a clamping mechanism. This condition is advantageous as it provides a ready means for low power testing of the device 100 without expensive clamping arrangements and often with the involvement of less labor time.

As noted previously the electrical contact assembly 108 disposed within the apertured electrical contact 156 is hermetically sealed to the contact 156. This hermetic seal forms an integral portion of the hermetic sealing means for the semiconductor element 134 to which the contacts 108 and 156 are both electrically connected.

The electrical connections to the three regions of the element 134 are through the top surface 158 of the contact 156, through a bottom surface 224 of the support member 110, and by way of the connecting tab 218. The electrical connection to region 138 is achieved through the top surface 158 of the contact 156, the layer 172 of molybdenum disposed on the bottom surface 160 of the contact 156, the layer 174 of silver disposed on the layer 172 and electrically connected to the contact 152 affixed to the region 152. Electrical contact to the region 144 is achieved through the bottom surface 224 of the support member 110, the layer 130 of silver disposed on the uppermost mounting surface 116 of the member 110, the electrical contact 132 disposed on the layer 130 of silver and affixed to the region 144 by the solder layer 136. Electrical contact to the region 140 is achieved through the connecting tab 218 electrically connected to the contact member 220, which in turn is electrically connected to the button shaped contact 198 of the electrical lead 194 electrically connected to the contact 154 affixed to the region 140.

Figure 5:
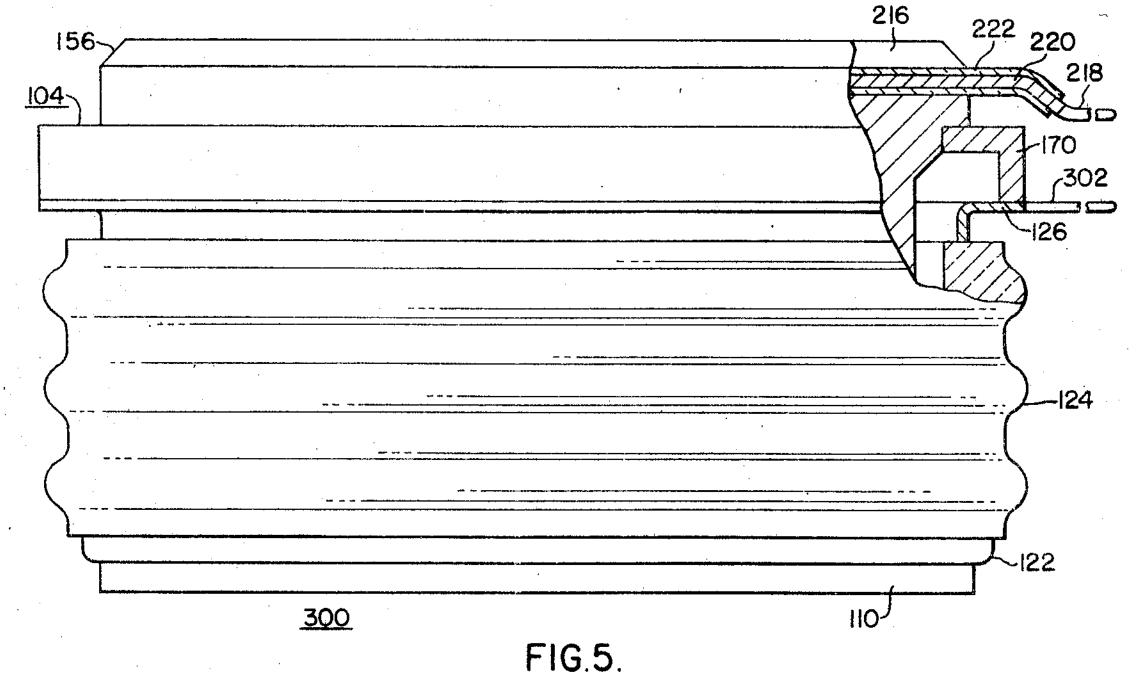

Referring now to FIG. 5 there is shown an electrical device 300 which is an alternate embodiment of the device 100 hereinbefore described. The device 300 is exactly the same as the device 100 except for an electrical terminal 302 electrically connected to the member 126. The device 300 is suitable for use in apparatus where an electrical connection to the region 138 of the element 134 cannot be made through the top surface 158 of the contact 156. The electrical connector 302 may be electrically connected to the member 126 by any suitable means such for example as by crimping or soldering. The connector 302 may also be manufactured as an integral part of the member 126.

The electrical connection to the region 138 is now achieved through the connector 302, the member 126, the weld ring 170, the contact 156, the layer 172 of molybdenum disposed on the bottom surface 160 of the contact 156, the layer 174 of silver disposed on the layer 172 and electrically connected to the contact 152 affixed to the region 138.

While the invention has been described with reference to preferred embodiments and examples, it will be understood of course, that modifications, substitutions, and the like may be made therein without departing from its scope.

We claim as our invention:

1. An electrical device comprising (a) a pair of spaced opposed electrical contacts, one of said contacts having walls defining an aperture therein;

(b) a hollow electrical insulator member hermetically joined to said pair of spaced electrical contacts to form an enclosure therewith enclosing the space between said pair of spaced electrical contacts, said pair of spaced electrical contacts forming opposed major surfaces of said enclosure;

(c) a semiconductor element disposed within said enclosure, said element having at least three regions of alternate type semiconductivity, a first region of said element being in a physical, electrical and thermal conductive relationship with one of said electrical contacts, and a second region of said element being in a physical, electrical and thermal conductive relationship with the second of said electrical contacts; and (d) an electrical lead hermetically sealed within said aperture of, and electrically insulated from, said one of said spaced electrical contacts and electrically connected to a third region of semiconductivity of said semiconductor element, said electrical lead comprising an electrical contact assembly comprising (1) a locator member disposed in the aperture of said one of said spaced electrical contacts, said member having a top surface, a bottom surface, and an axially disposed bore extending from said top surface to said bottom surface;

(2) an apertured resilient member disposed on said top surface of, hermetically joined to, and axially aligned with, said locator member, said resilient member having an inwardly extending flange portion, an outwardly extending flange portion, and a closed annular trough-like section of metal joining said inwardly extending flange portions, the outer periphery of said inwardly extending flange portion defining the aperture of said resilient member, said apertured resilient member being hermetically sealed to said one of said spaced electrical contacts; and (3) an electrical conductor extending downwardly through the aperture of said apertured resilient member, through the axially disposed bore of said locator member, and terminating in a button shaped electrical contact hermetically sealed to said bottom surface of said locator member.

2. The electrical device of claim 1 including a slot disposed in the top surface of said one of said spaced electrical contacts; and an electrically conductive member disposed in, and electrically insulated from, said slot and electrically connected to said electrical conductor of said electrical contact assembly.

3. The electrical device of claim 2 including a resilient force means disposed between, and acting on, said electrically conductive member and said apertured resilient member.

4. The electrical device of claim 3 in which:

the electrical connection between said electrical conductor and said third region of semiconductivity of said element is a pressure electrical contact.

5. The electrical device of claim 4 in which:
the electrical connections between said spaced electrical contacts and said semiconductor element is a pressure electrical contact.

References Cited

UNITED STATES PATENTS

| | | | |
|---|---|---|---|
| 3,192,454 | 6/1965 | Rosenheinrich et al. | 317—234 |
| 3,287,610 | 11/1966 | Reber | 317—234 |

FOREIGN PATENTS

| | | |
|---|---|---|
| 1,000,023 | 8/1965 | Great Britain. |
| 1,248,814 | 8/1967 | Germany. |

JERRY D. CRAIG, Primary Examiner

U.S. Cl. X.R.

174—52